United States Patent [19]
Valois

[11] Patent Number: 6,125,943
[45] Date of Patent: *Oct. 3, 2000

[54] DEVICE, INCLUDING A FREELY, PIVOTABLE, IMPACT ABSORBING SWING ARM FOR TRENCHING AND THE LIKE AND METHOD

[76] Inventor: Charles S. Valois, 4 Jersey Ct., New Windsor, N.Y. 12553

[ * ] Notice: This patent issued on a continued prosecution application filed under 37 CFR 1.53(d), and is subject to the twenty year patent term provisions of 35 U.S.C. 154(a)(2).

[21] Appl. No.: 08/815,837

[22] Filed: Mar. 12, 1997

[51] Int. Cl.⁷ .................................................. A01D 34/00
[52] U.S. Cl. .............................. 172/15; 56/17.1; 56/13.7; 56/256
[58] Field of Search .................................. 172/13, 1, 18; 56/13.6, 13.7, 17.1, 2, 256, DIG. 9, DIG. 17; 30/292, 319

[56] References Cited

U.S. PATENT DOCUMENTS

| | | | |
|---|---|---|---|
| 2,707,361 | 5/1955 | Thomas | 56/13.7 |
| 2,771,730 | 11/1956 | True | 56/256 |
| 3,183,652 | 5/1965 | Pratt | 56/17.1 X |
| 3,192,693 | 7/1965 | Bergeson | 172/13 X |
| 3,421,300 | 1/1969 | Rhodes . | |
| 3,533,223 | 10/1970 | Gunn et al. | 172/15 |
| 3,653,447 | 4/1972 | Stoner . | |
| 3,693,334 | 9/1972 | Lowery | 56/17.1 X |
| 3,852,944 | 12/1974 | Zuercher . | |
| 3,977,475 | 8/1976 | Zugai | 172/15 |
| 4,318,267 | 3/1982 | Green | 172/15 X |
| 4,442,659 | 4/1984 | Enbusk | 56/256 X |
| 4,478,028 | 10/1984 | Dawson, Jr. | 56/256 X |
| 4,551,967 | 11/1985 | Murcko | 56/17.1 X |
| 4,589,508 | 5/1986 | Hoover et al. | 180/19.1 |
| 4,767,128 | 8/1988 | Terhune | 280/47.2 |
| 4,825,569 | 5/1989 | Porter . | |
| 4,939,854 | 7/1990 | Boren . | |
| 5,156,218 | 10/1992 | Metzler et al. | 172/13 X |
| 5,560,189 | 10/1996 | Devillier et al. | 172/14 X |

*Primary Examiner*—Victor Batson
*Attorney, Agent, or Firm*—W. Patrick Quast, Esq.

[57] ABSTRACT

An edger-trencher is described for landscaping procedures. Instead of the usual jolting an operator receives when using traditional power assisted edger-trencher devices, in the instant invention a pivotable swing arm with cutting blade attached at one end pivots upwards and away from the soil containing an obstruction. The cutting blade then falls back rapidly and repeatedly under the influence of gravity, causing a series of pick like actions on the soil obstruction until it is overcome and normal edging or trenching resumes. The pivotable swing arm-cutting blade combination is suitable for mounting on stand-alone gasoline powered, belt-driven edger-trenchers. Alternatively, this stand-alone unit can be modified to have a quick connection to a similarly modified commercial or residential mower of the rider or walk behind type. For heavy duty operations hydraulically powered professional mowers can be supplied with the pivotable swing arm-cutting blade combination, or existing professional mowers can be retro-fitted with a hydraulic power supply for the pivotable swing arm-cutting blade combination.

21 Claims, 16 Drawing Sheets

DEVICE, INCLUDING A FREELY, PIVOTABLE, IMPACT ABSORBING SWING ARM FOR TRENCHING AND THE LIKE AND METHOD

BACKGROUND

This invention relates to power assisted landscaping machines, and in particular to such devices for lawn edging and trenching.

Quality landscaping today often involves extensive detailed demarcations between plant and floral bed areas and lawns. In addition, lawns frequently require trenches to be dug for such tasks as cable installation, underground irrigation systems, installing drainage piping, and so on. Landscaped areas associated with parks, government buildings, hospitals, and other extensive lawns obviously require mechanized equipment for economical maintenance of these grassy areas. And the increased sophistication of home owner's lawn maintenance requirements has necessitated landscaping professionals to offer competitively priced services.

In the past many devices have been used and proposed for power assisted lawn edging procedures. For example, U.S. Pat. No. 3,192,693, issued Jul. 6, 1965, teaches connecting a lawn edger attachment to either side of a conventional rotary blade type power lawn mower 10 (FIG. 1). Again, in U.S. Pat. No. 3,421,300, issued Jan. 14, 1969, teaches an edger attachment for either permanent or removable attachment to a conventional rotary blade type power lawn mower 15 (FIG. 1). Other power assisted devices for lawn edging have been disclosed, including the disclosures of U.S. Pat. No. 3,653,447, issued Apr. 4, 1972, in which a vertical edger blade is described; U.S. Pat. No. 3,852,944, issued Dec. 10, 1974, in which means for utilizing the exhaust from a gasoline powered engine to blow debris caused by the edging procedure neatly into the adjacent plant bed is described; U.S. Pat. No. 3,977,475, issued Aug. 31, 1976, in which a power assisted lawn edger is described which can be tilted out or into operative position as required; U.S. Pat. No. 5,156,218, issued Oct. 20, 1992, in which a power assisted angled and serrated edging blade to form a trenched demarcation line around intricate mulch and grassy area landscape lines is described.

Similarly, in the past many power assisted devices have been employed and proposed for digging trenches in lawns for laying pipe lines, electrical cable, and the like. In U.S. Pat. No. 3,719,765, issued May 16, 1967, specially designed cutting blades and a shroud mounted at the front of a wheeled internal combustion engine is disclosed, providing for neatly depositing the trenched soil along side of the trench so that is can be quickly and easily pushed back into the trench for recovering items to be placed in the trench; U.S. Pat. No. 4,825,569, issued May 2, 1989, teaches the use of a power assisted trenching blade combined with means for laying a cable in the trench, and back filling the trench with dirt at substantially the same time; U.S. Pat. No. 4,939,854, issued Jul. 10, 1990, discloses a power assisted trenching machine that can be easily converted between push or pull type models by using same parts at the manufacturing stage.

While the above noted edging and trenching devices provide useful solutions to a variety of landscaping procedures, they do not address the specific improvements embodied in the instant invention. In the present invention a cutting blade of either the edging type or trenching type is connected at one end of a pivotable swing arm which in turn is secured to a stand alone machine incorporating the features of the invention, or to a commercial lawn mower. Power assisted by either hydraulic or belt-drive means, the swing arm is caused to pivot up and down rapidly when the cutting blade encounters soil resistance greater than the combined weight of the swing arm and blade, resulting in a smooth, efficient, and "jolt free" edging or trenching operation that was heretofore not possible.

It is therefore a primary object of the invention to provide a power assisted lawn edger-trencher capable of smooth, "jolt free" soil cutting operations.

Another object is to provide a permanently installed hydraulic drive for the pivotable swing arm-cutting blade combination of the invention.

Still another object is to provide for a rapid quick connect of a hydraulic or belt drive to a commercial or residential power mower, either of the rider or walk behind type, for power assisting the pivotable swing arm-cutting blade combination of the invention.

A further object is to provide a stand-alone edger-trencher wherein a standard belt-drive provides the power assist for the pivotable swing arm-cutting blade combination of the invention.

An additional object of the invention is to provide interchangeable edger and trencher blades on the pivotable swing arm of the invention.

Still another object is to provide for operator selected rotational speed control over the cutting blade of the invention.

Yet another object is to provide for operator control of the depth of the groove within the soil during edging or trenching procedures.

A further object is to provide a cutting blade for trenching operations to further assist the smooth, "jolt-free" operation of the pivotable swing arm-cutting blade combination of the invention.

Still another object of the invention is to provide a conventional stand-alone belt driven unit to be able to attach and detach to a commercial or residential mower of either the rider type or walk behind type.

SUMMARY

These and other objects are obtained with the power assisted edger-trencher of the instant invention.

Typical past procedures employed by landscaping professionals when providing attractively demarcated areas between grassy areas and plant beds, or when a trench had to be dug for electrical cables, irrigation pipes, and the like, involved either hand defining areas with a shovel, or more efficiently and economically, with a power assisted edger-trencher machine. These prior soil groove cutting devices have usually been belt-drives powered by gasoline engines, at least for supplying the power for rotating soil cutting blades affixed to the edger-trencher. These devices have been as simple as a hand pushed wheel frame with power assist only for the soil cutting blade, or more elaborate devices combining a power lawn mower and edger-trencher cutting blades with provisions for seating an operator on the machine during operation. The devices tend to be marketed as "edgers" for demarcating grassy areas from plant bed areas, or "trenchers" for providing grooves for laying cables, pipes, etc. In these past examples, when the cutting blade encountered heavy soil resistance, such as a rock or a root, the blade tends to stop and the belt-drive to slip, repeatedly subjecting the operator to a continuing series of jolts. Those skilled in the art will recognize that this continuous jolting is fatiguing and inefficient. In addition these continuous jolts inevitably put additional strains on the power assist motor.

In the instant invention it has been found that this continuous jolting can be eliminated, resulting in smoother, more efficient edger-trencher procedures with far less operator fatigue. This is accomplished by placing the cutting blade on one end of a swing arm, the blade being a spaced distance from a pivot point on the swing arm. The swing arm itself is connected at the front or either side of a wheeled frame (such as a three or more wheeled frame which carries the power assist motor). With the wheeled frame being moved over a lawn area, and with the power assist motor for rotating the cutting blade activated so as to cause the cutting blade to rotate, a smooth and jolt free edge or trench is formed by the cutting blade depending upon whether an edger type of cutting blade or trencher type of cutting blade is employed. This unique jolt free cutting action is accomplished as follows. When the cutting blade encounters a degree of soil resistance, due to rocks or roots and the like, high enough to overcome the combined weight of the cutting blade and the swing arm, the cutting blade is caused to bounce upwards and away from the soil and then to immediately fall down to the soil under the influence of gravity, further assisted by downward pressure due to the rotation of the belt when belt drives are employed. This action causes the cutting blade to behave in a pick like fashion, rapidly and continually picking at the obstruction in the soil until it is overcome, and the edging or trenching continues. This efficient and benign action is in sharp contrast to the jolting, stop and start action previously associated with edging and trenching operations. Soil being moved by the cutting blade is thrown outwards and away from the edge or the trench being cut. A blade guard mounted on the swing arm adjacent the cutting blade provides for directing the thrown soil into the bed area.

The pivotable swing arm principle of the instant invention can be adapted to convert standard belt driven edgers or mowers for this efficient, jolt free operation. Or a stand-alone belt driven edger-trencher incorporating these principles can be made commercially available. In addition this stand-alone belt driven edger-trencher can be adapted for quick connection to a commercial or residential mower either of the rider or walk alone type. For still further efficiencies, particularly in the case of difficult trenching operations, the cutting blade can be rotated utilizing hydraulic pressure. For example, the existing hydraulic system in a hydraulically powered professional mower can be tapped into to drive a hydraulic motor affixed to the cutting blade end of the pivotable swing arm. Or a professional mower can be retrofitted with a separate hydraulic power supply for hydraulically powering the cutting blade. And, of course, an hydraulically powered professional mower can be manufactured with the pivotable swing arm-cutting blade combination in place.

The use of a hydraulic drive for edging and trenching procedures offers many advantages. Typical hydraulic motors feature 4 to 5 H.P. in contrast to the usual 2½ H.P. to 3 H.P. of a conventional edger. These more powerful hydraulic motors offer operator speed control as against belt-driven units wherein the speed of the engine is directly associated with the speed of the blade, and cannot be adjusted separately. In addition, hydraulic drives can be operated at slower R.P.M.'S while maintaining high performance characteristics. Under low R.P.M. conditions the hydraulic internal pressure becomes more powerful, and will not stall or slip which is typically the case with a belt-driven edger-trencher.

In addition to the pivotable swing arm of the invention, a new concept in a trenching blade is described. This unique trenching blade incorporates one or more spring loaded blades to further cooperate with the up and down "pick like" action of the swing arm. When the spring loaded trenching blade encounters high soil resistance the blade is contracted by this resistance, and therefore slips over the object as the swing arm bounces up, and then under the force of gravity returns the now fully extended trenching blade to continue whatever series of picks at the high soil resistance is required until normal trench formation is resumed.

Thus the instant invention provides new efficiencies and conveniences in landscaping edging and trenching procedures. Standard belt-driven edger-mowers, or hydraulically driven professional mowers can be retrofitted with the pivotable swing arm and standard or unique cutting blade combinations of the invention. The stand-alone belt driven edger-trencher can be further adapted for quick connection to commercial or residential mowers of the rider or walk behind type. Or specially designed edger-trenchers and mowers can be manufactured, with either belt-driven or hydraulic drives, incorporating the principles of the invention.

DETAILED DESCRIPTION

Figure 1:
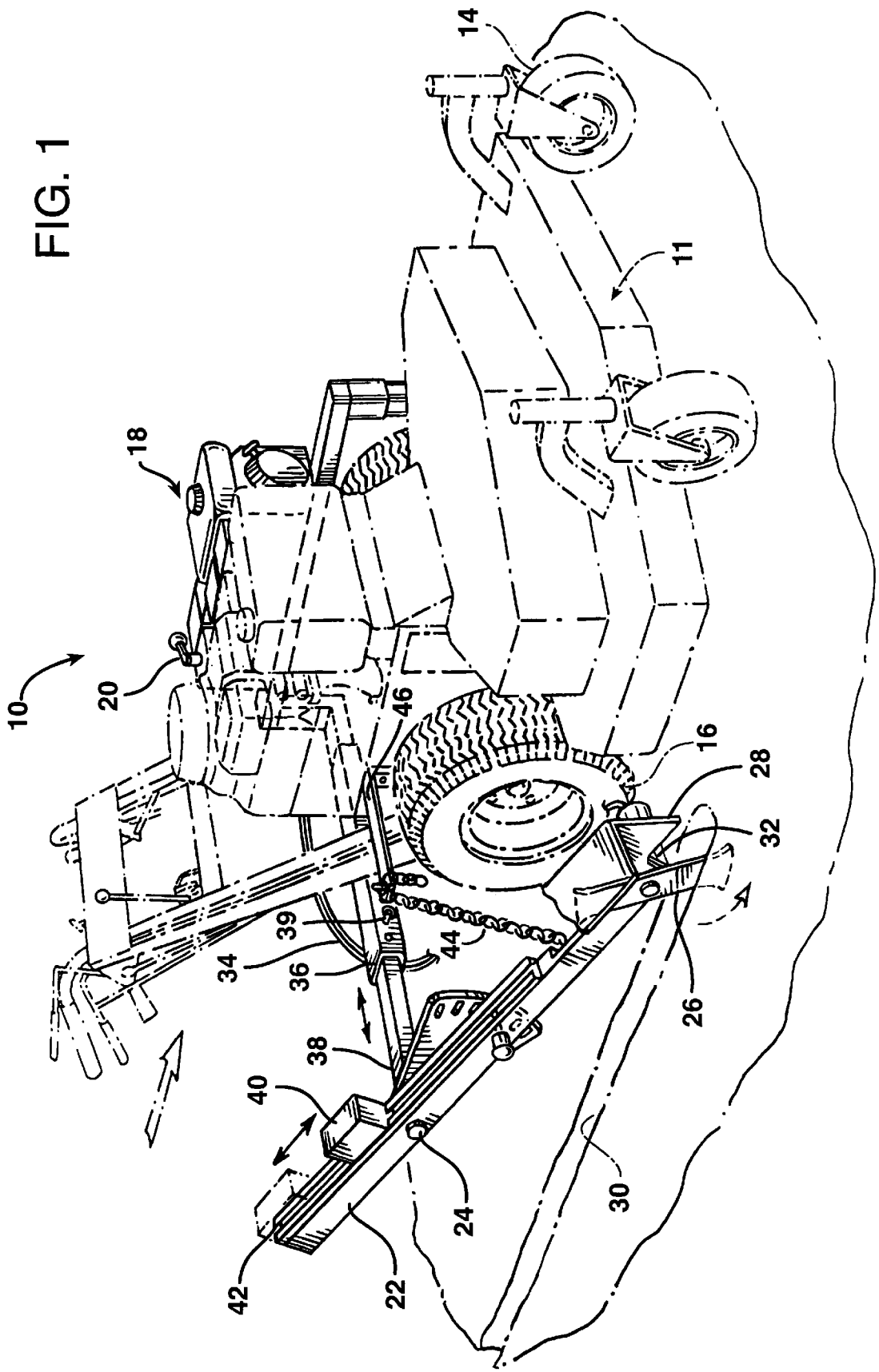
FIG. 1 is a perspective view of one version of the edger-trencher of the invention wherein the hydraulic power supply is an integral part of a professional mower.
Figure 2:
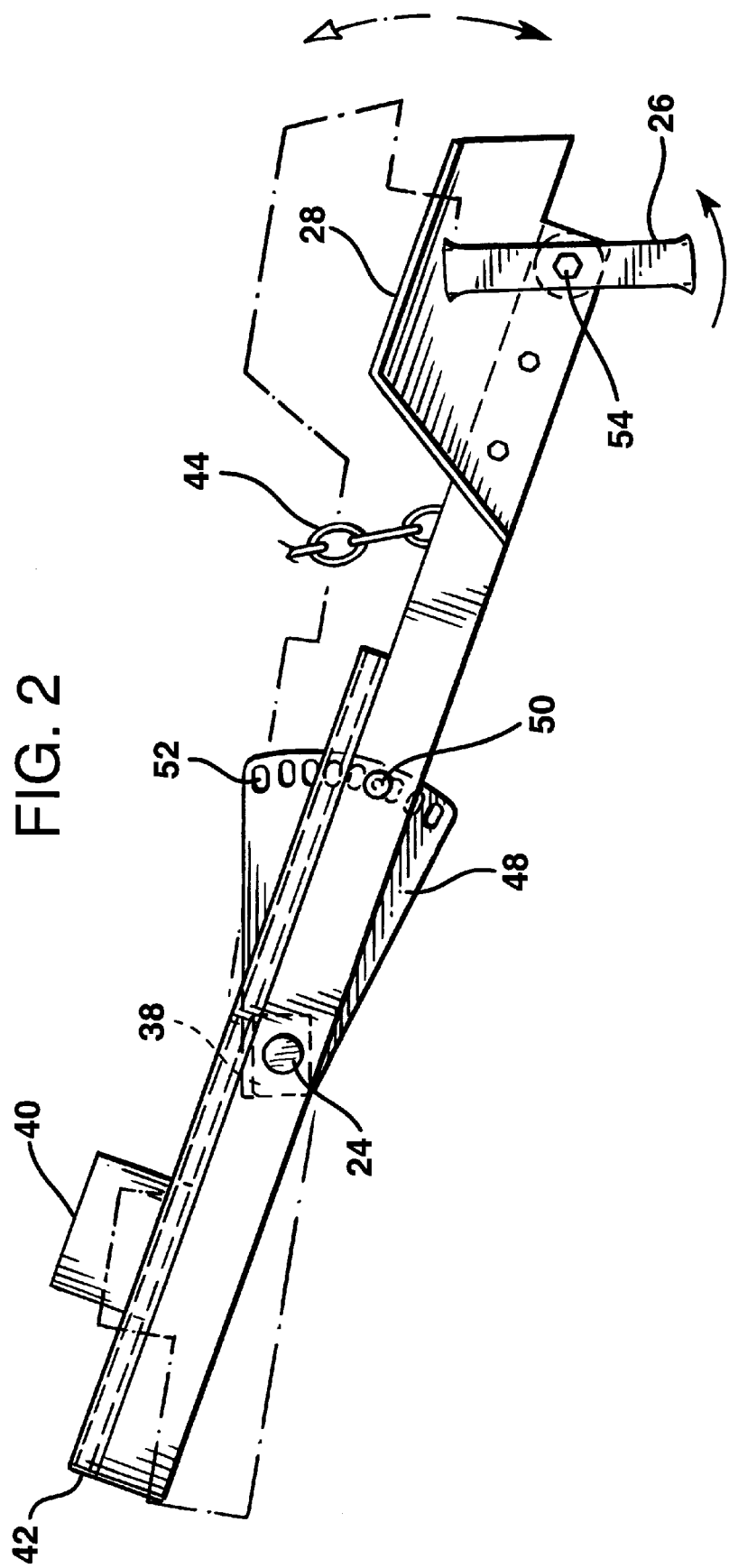
FIG. 2 is a side elevational view of one version of the pivotable swing arm-cutting blade combination of the invention.
Figure 3:
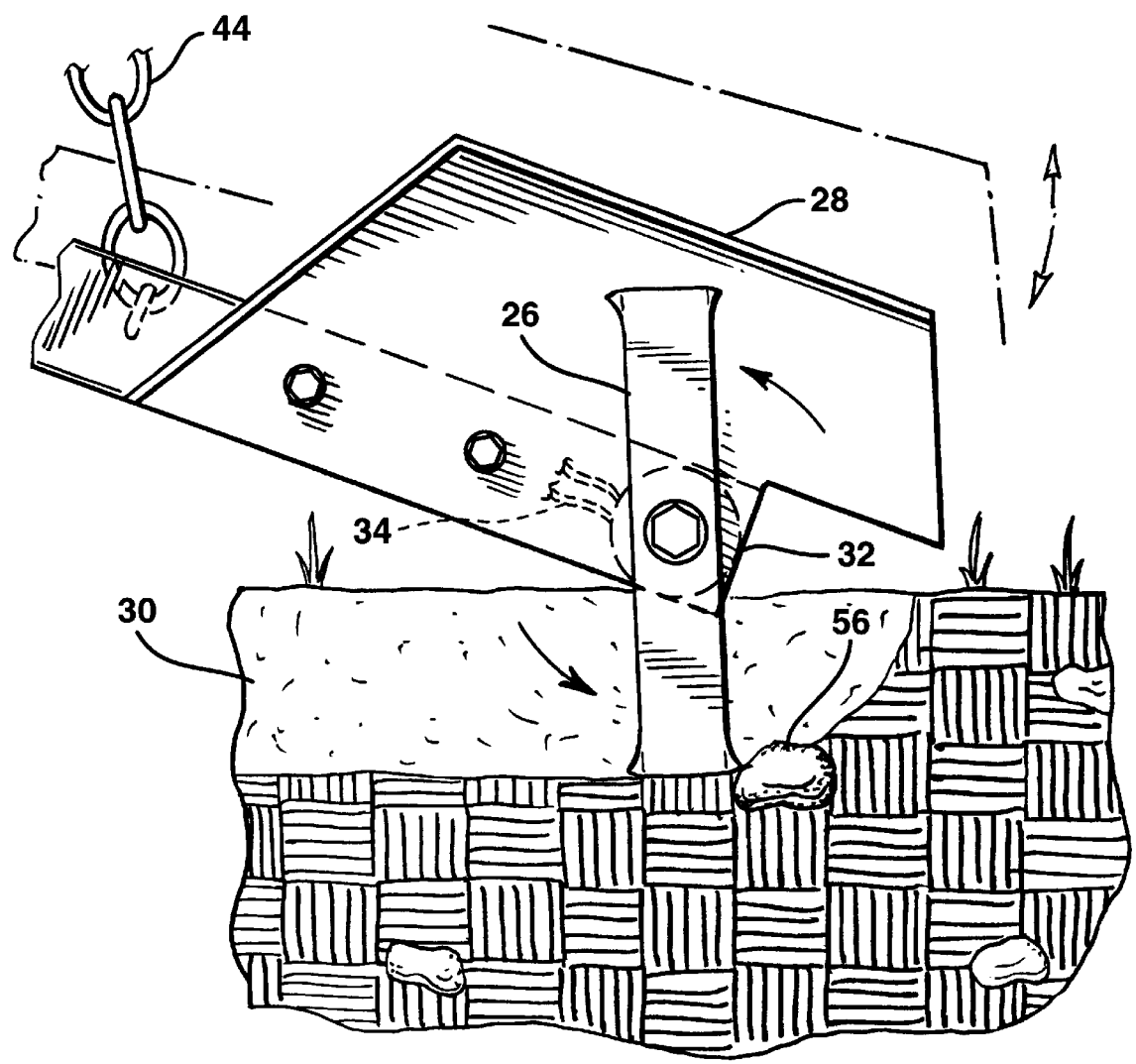
FIG. 3 is an enlarged side view of an edging blade in the process of edging.
Figure 6:
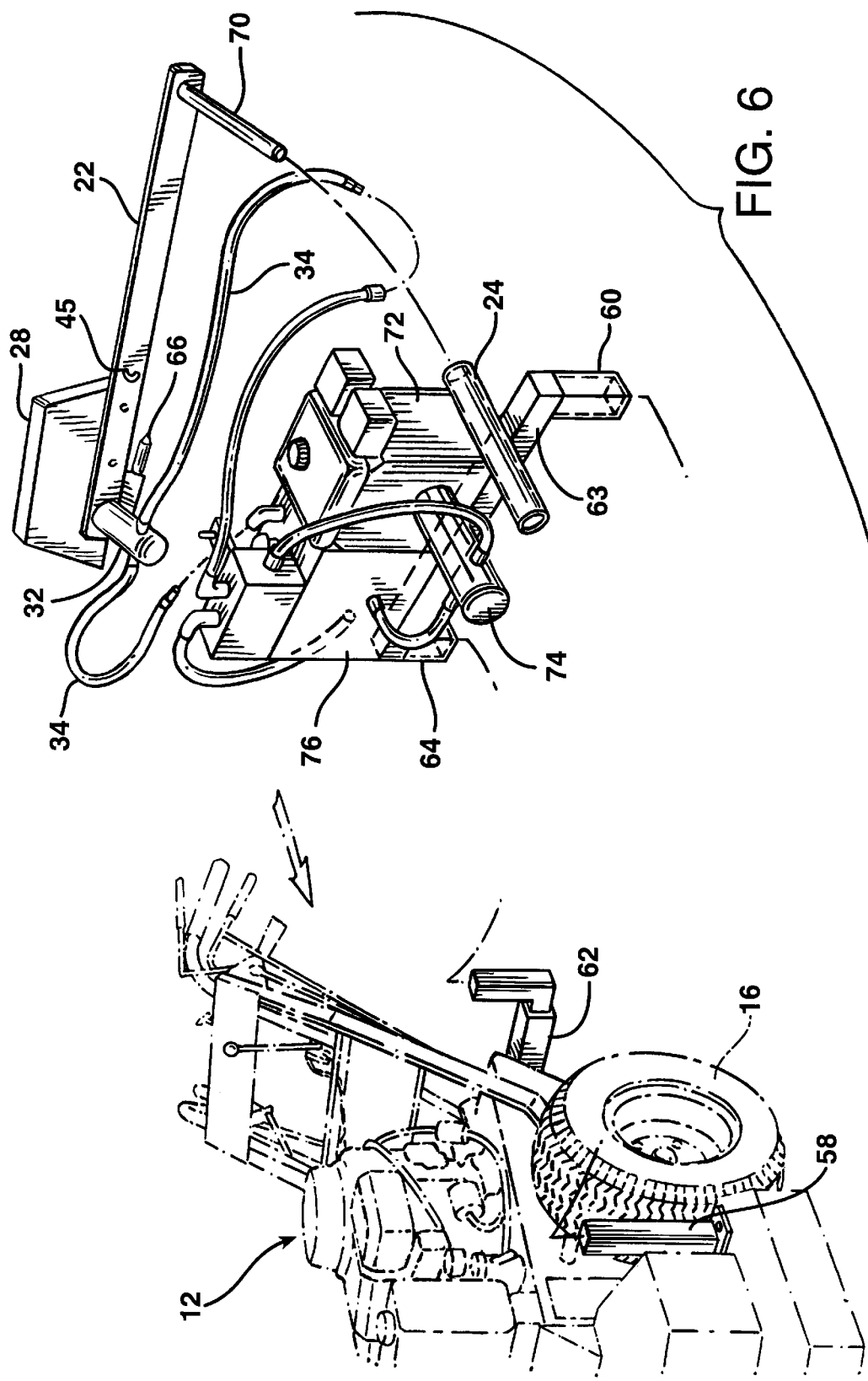
FIG. 6 is an exploded perspective view of the version of the edger-trencher depicted in FIG. 4.

Referring now to the drawings wherein similar structures having similar functions are denoted with the same numerals in the several views, in FIG. 1 a professional lawn mower 10 having a built-in hydraulic power supply 18 is illustrated. The lawn mower itself is shown in phantom. The professional mower has a wheeled frame 11 being made mobile with two rubber front wheels 14, and two rubber rear wheels 16. Fluid pressure from the hydraulic power supply is regulated by a movable control rod 20. The professional mower 10 is shown as being converted into one version of the edger-trencher of the invention. Extending laterally to one side of the mower a mounting bar sheath 36 provides the means for connecting a mounting bar 38, this bar in turn being affixed to a pivotable swing arm 22 which can be located at either the left or the right side of the mower depending on which side of the mower the mounting bar sheath 36 is connected. As best seen in FIGS. 1–3, the pivotable swing arm 22 extends in a substantially parallel plane to the mower at either the left or right side of the mower 10, with a cutting blade (in this illustration an edger blade 26) being rotatably affixed to the front end of the pivotable swing arm, i.e. the end of the swing arm adjacent the two front wheels 14 of the mower. The edger blade 26 is rotatably affixed to the shaft (not shown) of an hydraulic motor 32, the motor shaft extending through openings (not shown) in the swing arm and edger blade, being affixed to the edger blade via a nut 54. Hydraulic fluid lines 34 (see FIGS. 4 and 6) connect between the hydraulic power supply 18 and the hydraulic motor 32 for providing the rotational power to the motor in order to rotate the edger blade 26. A blade guard 28 is connected at the front end of the swing arm 22. The blade guard is positioned between the mower 10 and the edger blade 26 so as to protect the operator of the mower from dirt and other debris thrown by the edger blade, and to direct this dislodged dirt away from the groove 30 being formed by the blade and onto the adjacent bed (not shown). The swing arm is connected by means of a pivot 24 to the mounting bar 38 which in turn slips into the mounting bar sheath 36 affixed to the side of the mower, the mounting bar 38 and mounting bar sheath 36 being secured together by a threaded bolt 39. A rigid adjuster plate 48 is fixedly connected to the mounting bar and disposed adjacent the swing arm 22 with the pivot 24 pivotally securing the swing arm and extending through a hole in the rigid adjuster plate. The important function of the rigid adjuster plate will be more fully explained. The swing arm also extends a spaced distance in length from the pivot to a rear end portion of the swing arm. A counter-weight 40 is frictionally secured within a groove 42 formed within the top length of the swing arm, the groove 42 extending from the rear end portion of the swing arm to a point a spaced distance away from the front end of the swing arm. A chain 44, which is adjustable in length, is secured between the swing arm and a laterally extending support bar 46 affixed to the mower.

The pivotable swing arm and cutting blade of the invention, as depicted and described above, operates in the following manner. The chain 44 connecting the support bar 46 to the swing arm 22 is adjusted in length so that the cutting blade will form a groove of sufficient depth to satisfy the requirements of the operator. The counterweight 40 is adjusted to a position along the length of the counter-weight securing groove 42 within the swing arm. The positioning of the counter-weight along the length of groove 42 provides means for the user to purposely adjust the downward force exerted by the blade upon the soil and thus compensate for different soil conditions, enabling the user to continue digging the groove through a variety of soil conditions. For heavy soil conditions the counter-weight 40 is moved towards the front end of the swing arm; for light soil conditions the counter-weight is moved towards the rear end of the swing arm. The hydraulic power supply 18 is turned on, and as the mower 10 moves over the lawn the speed of the edger blade 26 rotation is adjusted by means of the hydraulic power supply adjust lever 20. As can be seen in FIG. 3 (and also in FIGS. 4 and 5 for trenching operations which will be more fully discussed) the pivotable swing arm and cutting blade of the invention provide a unique action in sharp contrast to traditional edger-trenchers. Instead of coming to a stop when and object such as a rock 56 (FIG. 3) is encountered, thereby jolting the operator and straining the power supply motor, the blade 26 and swing arm will bounce upwards away from the rock and soil, and then under the influence of gravity, fall back onto the rock and soil in a rapid, picking motion. Under these conditions obstacles, such as rocks and roots, which inevitably lead to repeated jolts to the operator and strains on the power supply are efficiently and smoothly overcome. Both the operator and the machine are thus freed from the inefficient and fatiguing continuous jolting of traditional edger-trenchers. Of course, for those operations where typical edger-trencher in line cutting is desired the operator simply places the spring loaded pin 50 associated with the rigid adjuster plate 48 into an appropriate height adjusting slot 52 in the plate. The swing arm 22 will now operate in the usual, traditional manner, and will not pivot upwards when heavy soil conditions are encountered by the cutting blade.

While the above example depicted in FIGS. 1–3 are directed to typical edger blade and edging operations, the use of the hydraulically powered edger-trencher is especially useful for difficult lawn grooving operations often encountered in trenching operations. For the purposes of this invention it will be understood that the terms edger and trencher are used as rough equivalents to each other, with the term "edger" defining a groove demarking the areas between a lawn and a plant bed, and the term "trencher" defining a groove to be employed for laying a water pipe, electrical cable, and the like. Trenching requirements typically require deeper cuts to be made in a lawn area, and therefore the higher H.P. (usually 4 H.P. or more) and different operating characteristics of a hydraulic power supply make it ideal for these heavy duty requirements. For example, in a hydraulically driven machine the speed of rotation can be adjusted, whereas in gasoline powered, belt-driven machines the speed of the engine is directly associated with the speed of the cutting blade and cannot be adjusted separately. Also the hydraulically powered machines are more powerful at slower R.P.M.'S. When an object is struck the internal pressure of a hydraulic power supply will increase, rather than stall or slip as is often the case with a belt-driven machine.

In FIGS. 4–9 a professional mower 12 is illustrated as being rapidly converted into the edger-trencher of the invention, together with a trencher blade 66 which is specifically designed to cooperate with the up and down motion of the pivotable swing arm as high resistance soil areas are encountered. In this version of the invention all that need be permanently affixed to the professional mower are two hydraulic power supply mounting bars 58, 62 being connected to the frame of the mower 12, as, for example, to the left side and the right side of a rear wheel 16 of the mower. The hydraulic power supply comprising the hydraulic power supply motor 72, the hydraulic fluid pump 74, and the hydraulic fluid tank 76 are all mounted on a support bar 63 interconnecting a left hydraulic power supply mounting sleeve 60 and a right hydraulic power supply mounting sleeve 64. A pivot 24 is transversely affixed to the top surface of the hydraulic power supply support bar 63. In this case the pivotable swing arm 22 has a shaft 70 for the pivot affixed at a first end of the swing arm, with the blade guard 28 and cutting blades (specially designed trencher blade 66) being affixed to the second end of the swing arm. The hydraulic motor 32 for rotating the trencher blades 66 is also connected to the swing arm 22, blade guard 28, and a mounting plate 78 (FIG. 7) for securing the trencher blades at this second end of the swing arm. The complete swing arm assembly is then connected to the hydraulic power supply by sliding the pivot shaft 70 into the pivot 24 affixed to the hydraulic power supply support bar 63, and the hydraulic fluid lines 34 for powering the hydraulic motor 32 at the second end of the swing arm are connected between the hydraulic fluid tank 76 and the hydraulic motor 32. The combined swing arm-trencher blade-hydraulic power supply assembly can now be connected to the selected side of the professional mower by simply sliding the two hydraulic power supply mounting sheaths 64,66 into the two hydraulic power supply mounting bars 58, 62 permanently connected at either side of a rear wheel 16 of the mower. Finally a chain 44 for raising or lowering the swing arm to an operator determined appropriate height is affixed between a chain support bar 77 attached to the top surface of the hydraulic fluid tank 76 and a hook 45 adjacent the blade guard on the swing arm.

Figure 4:
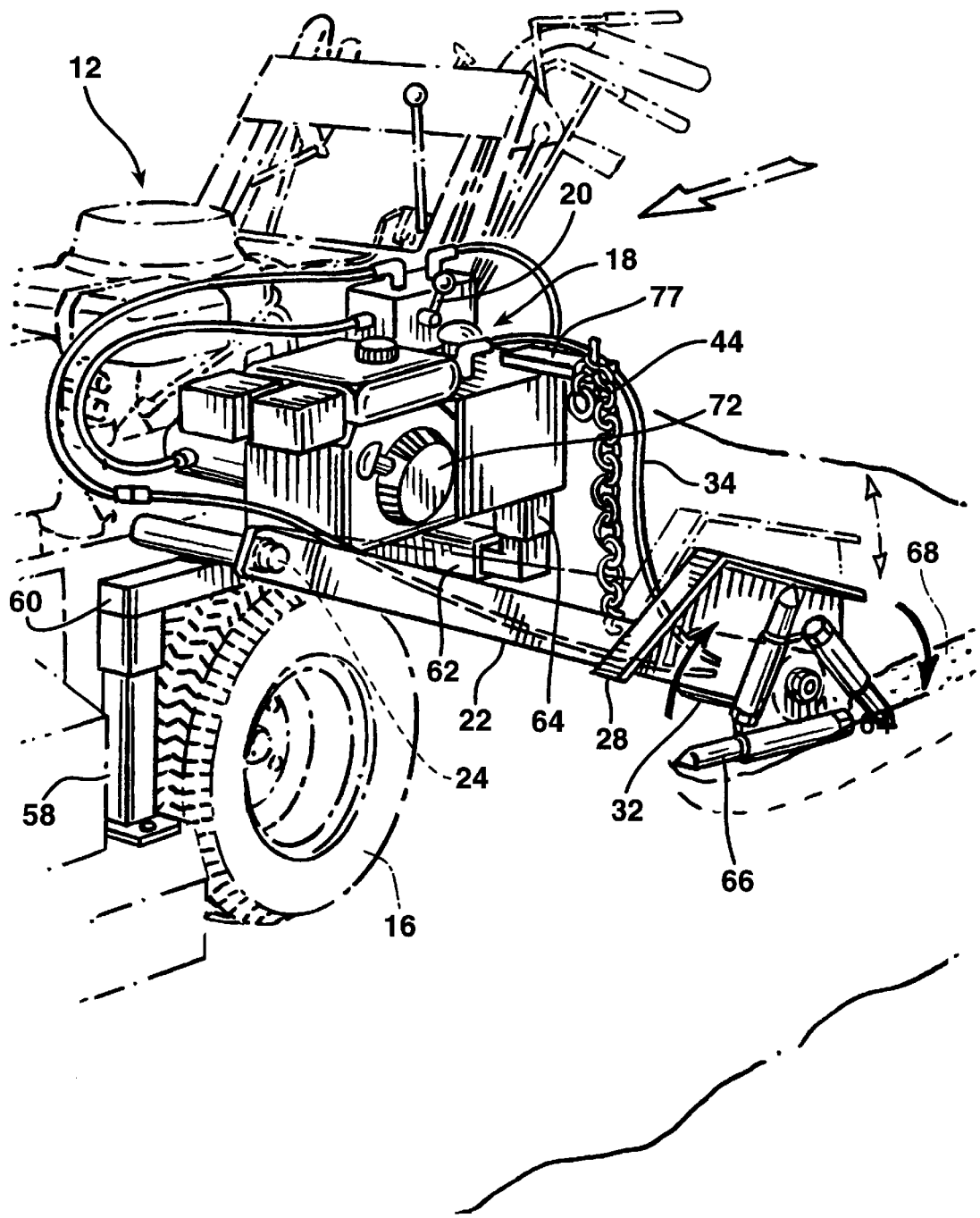
FIG. 4 is a perspective view of another version of the edger-trencher of the invention wherein the pivotable swing arm-cutting blade combination and hydraulic power supply are all mounted as a unit on a professional mower.
Figure 5:
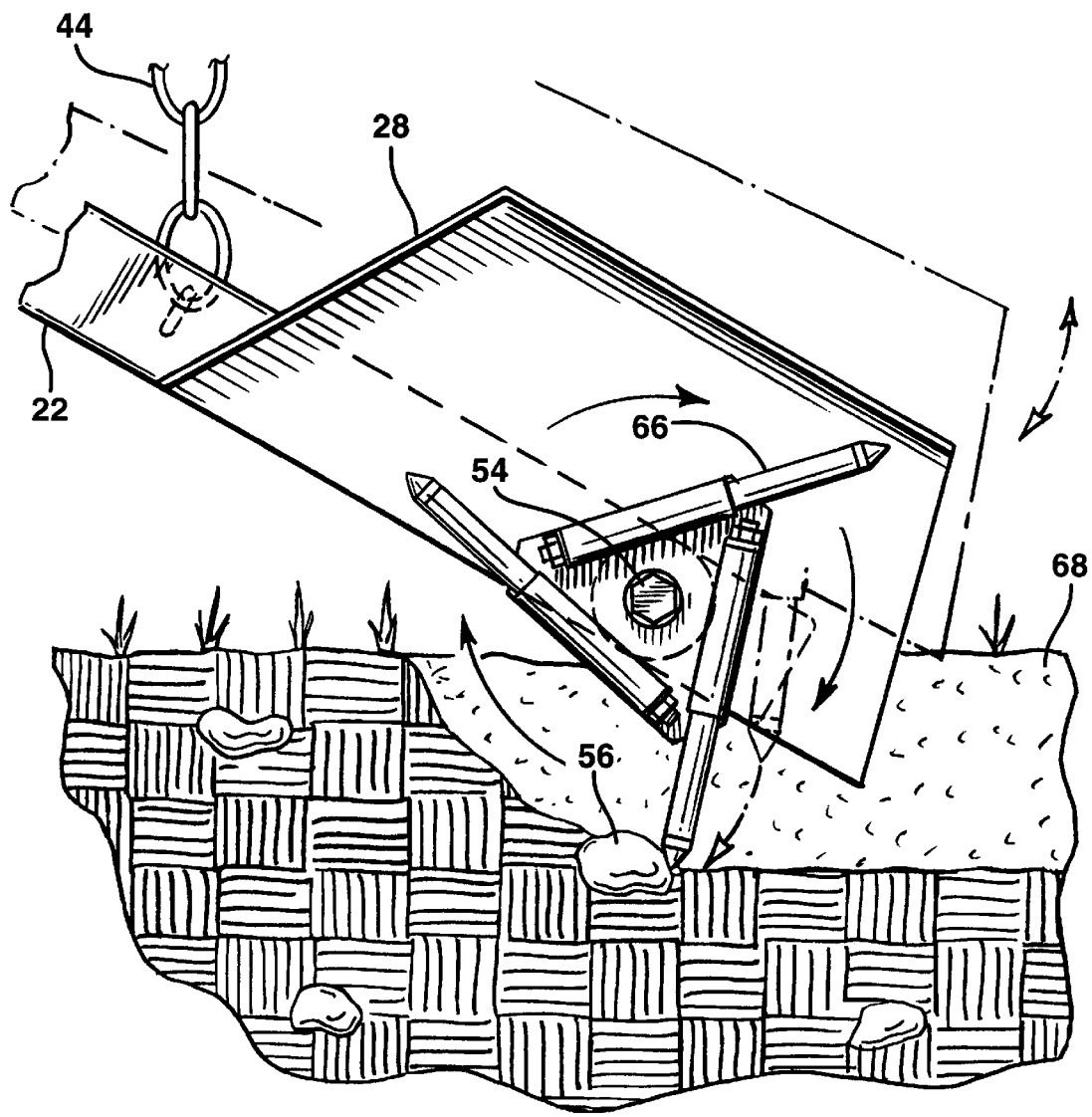
FIG. 5 is an enlarged side view of one embodiment of a trencher blade for use with the pivotable swing arm of the invention.
Figure 7:
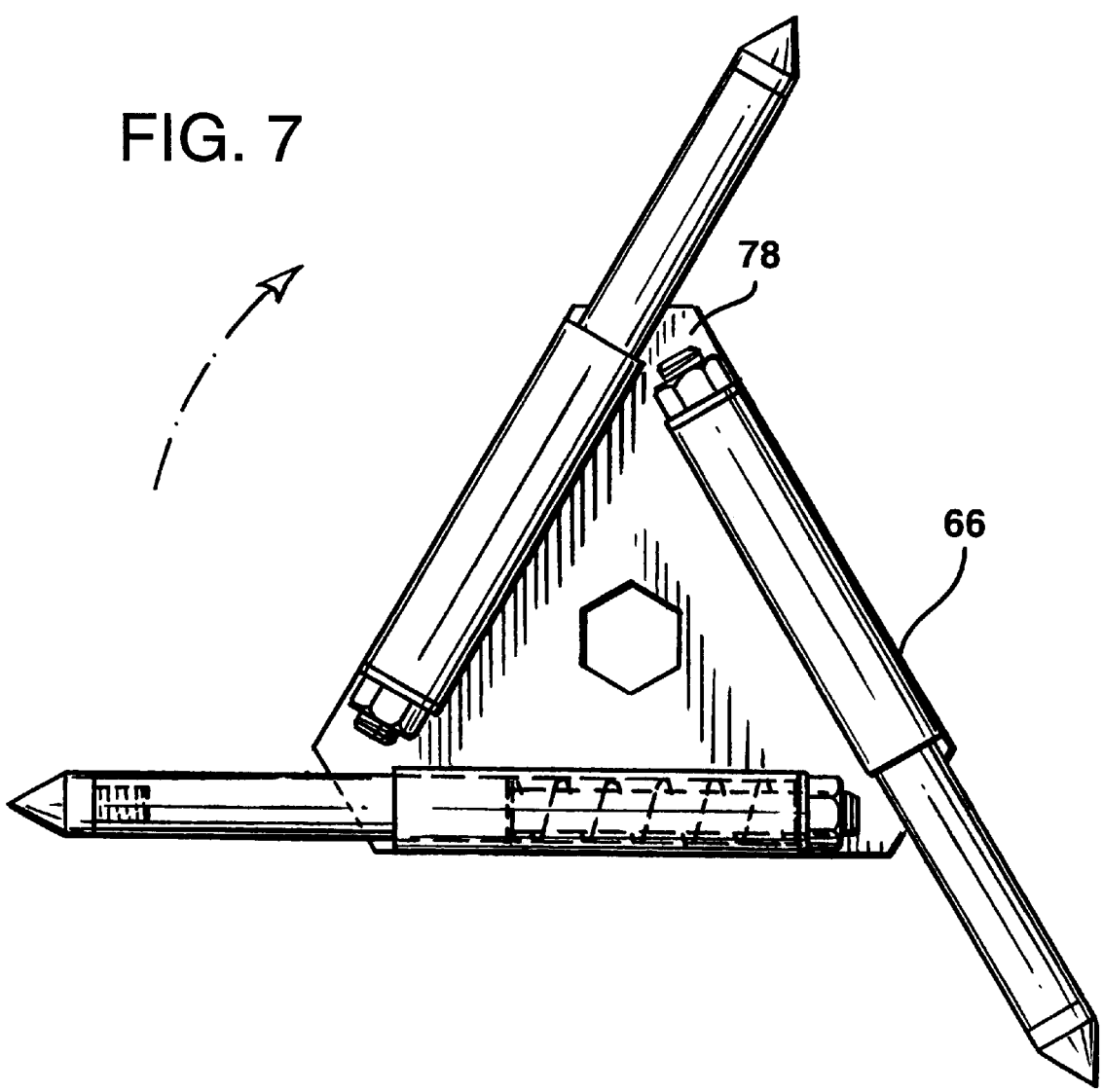
FIG. 7 is a side view of one version of a spring loaded trenching blade.
Figure 8:
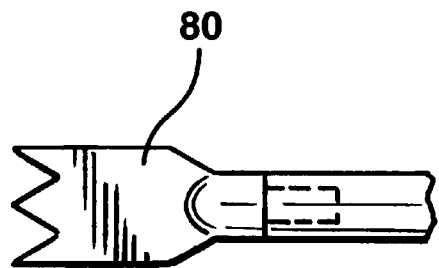
FIG. 8 is a side view of an alternative tip for the trenching blade of FIG. 7.
Figure 9:
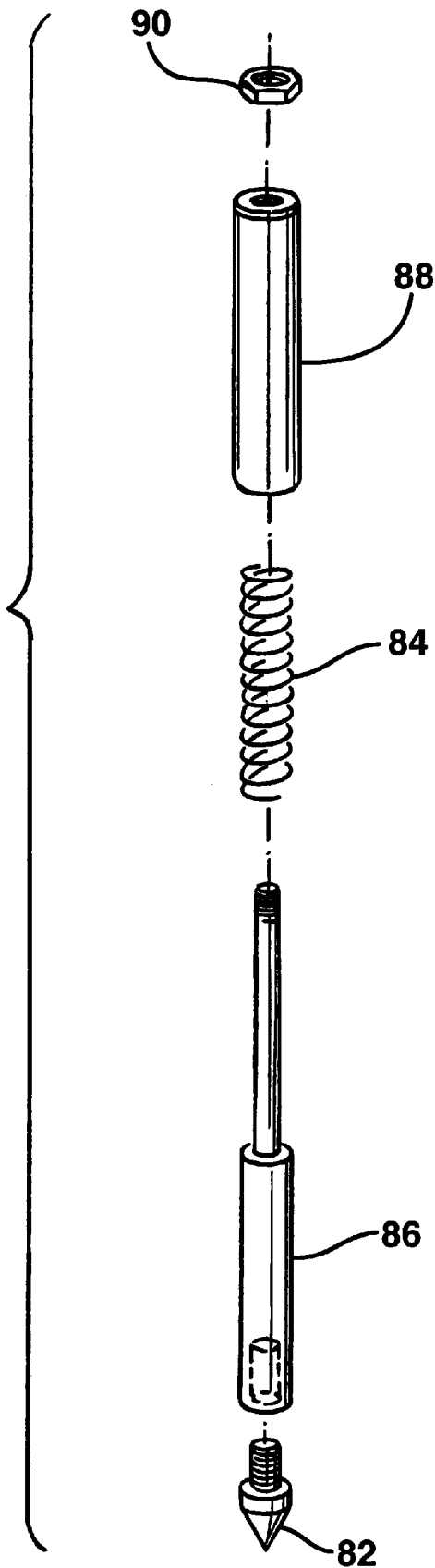
FIG. 9 is an exploded perspective view of a single spring loaded trenching blade depicted in FIG. 7.

As best seen in FIG. 4, in this arrangement the trencher blades 66 are positioned behind the rear wheels of the mower. Again, as in FIGS. 1–3, the principle of operation is the same. As the trencher blades 66 dig a trench 68 at the rear of the mower the swing arm will pivot upwards and away from the trench when a rock or other difficult soil conditions are encountered, and then fall back rapidly under the influence of gravity, effecting a picking action on the problem soil until cleared and trenching resumes. In FIGS. 5, 7, and 9 a specially designed trencher blade 66 is illustrated. The blade consists of a pointed tip portion 82 (or a serrated tip portion 80 as shown in FIG. 8), a two piece central portion consisting of a blade shock first portion 86, a shock housing second portion 88, and a nut 90 for attachment to the free end of the blade shock portion for securing the two portions together with a blade spring insert 84 enclosed within the two portions. One or more of trencher blades is affixed by welding or other suitable means to a mounting plate which is in turn rotatably connected to the hydraulic motor 32 by means of a bolt 54. The blade spring insert 84 within the trencher blade 66 permits the tip 82 and blade shock portion 86 of the blade to cooperate with the pivoting action of the swing arm 22 so as to slide more easily free of soil impediments when the swing arm is being pivoted upwards due to the soil obstruction.

Figure 10:
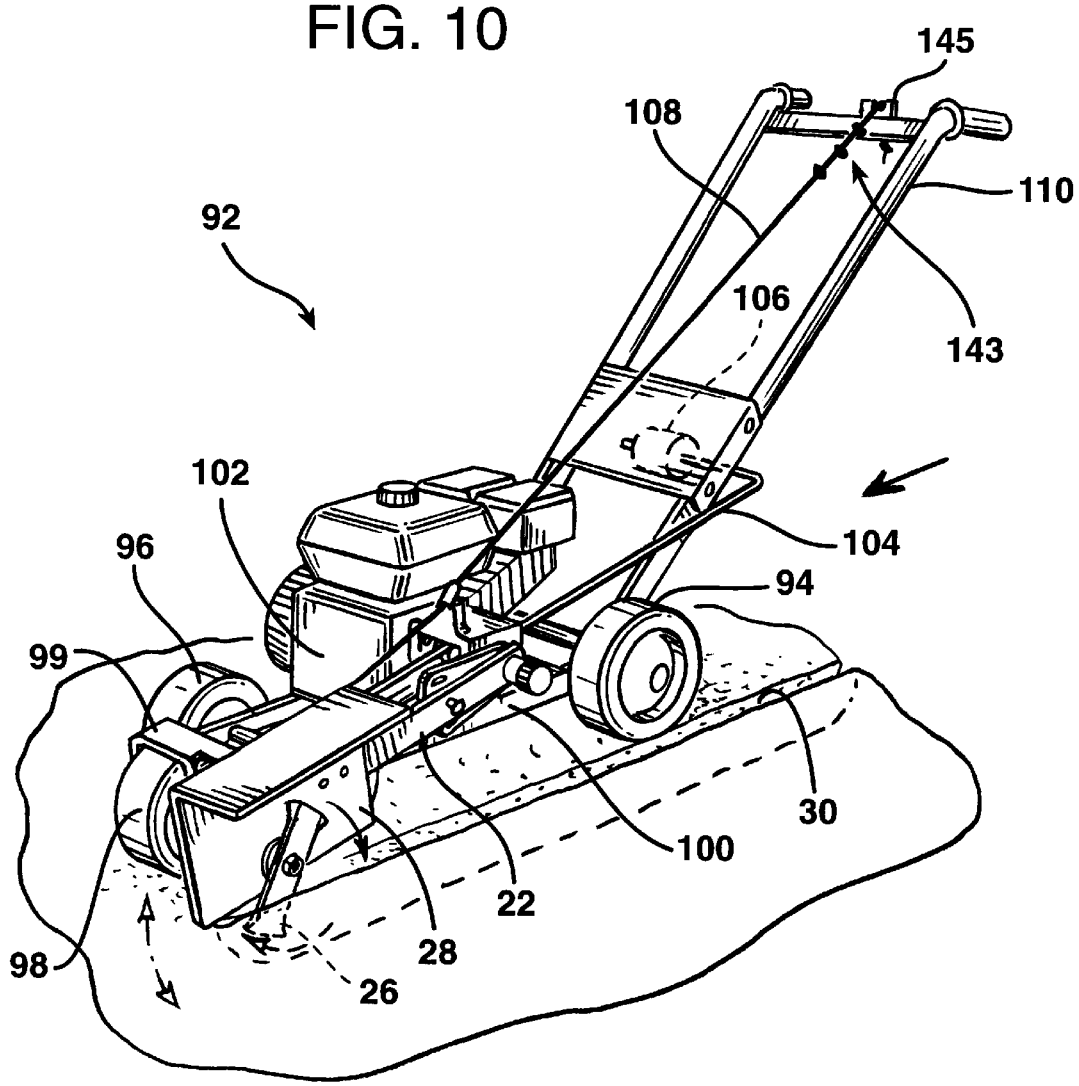
FIG. 10 is a perspective view of one version of a stand alone, belt-driven edger-trencher of the invention.
Figure 11:
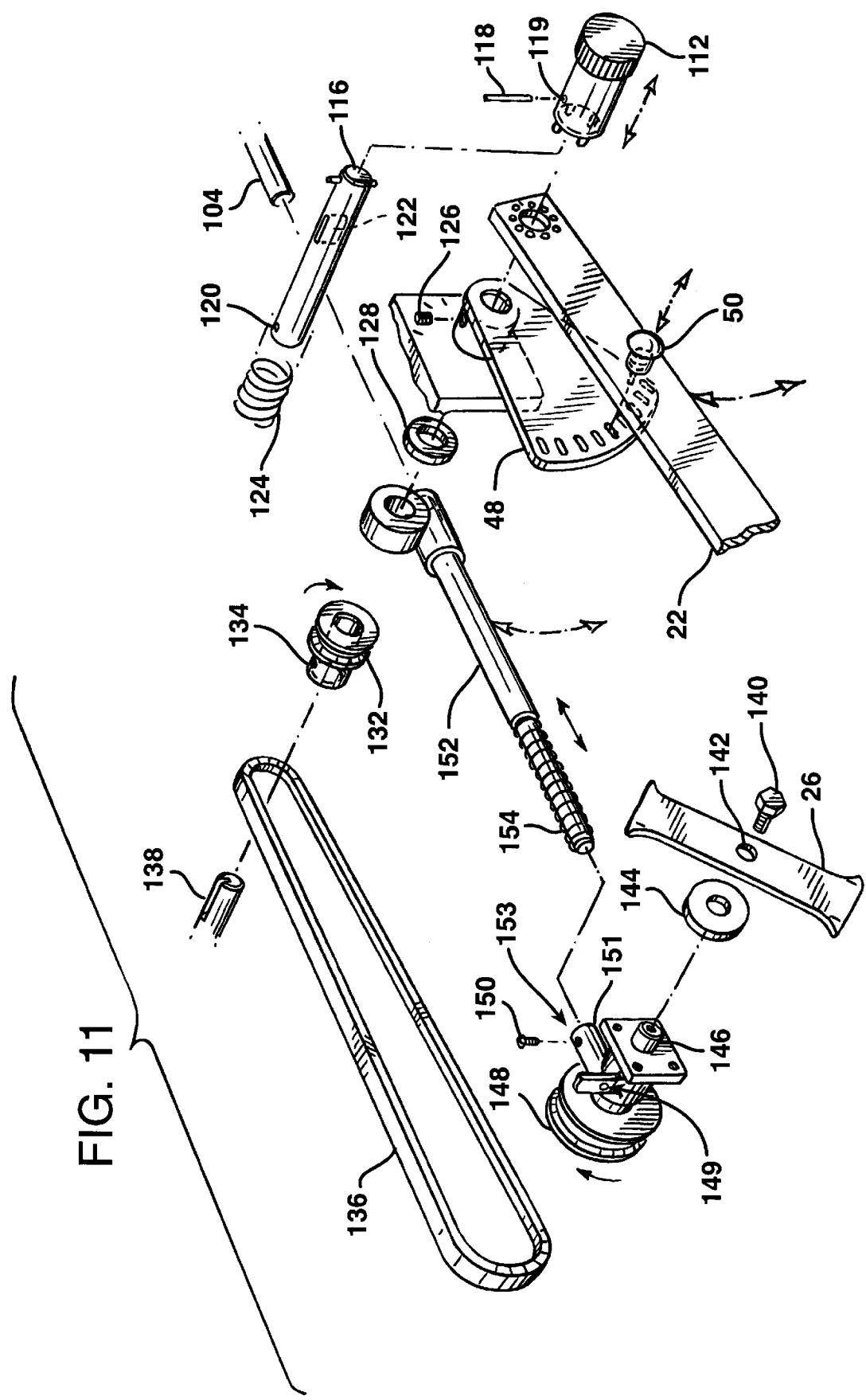
FIG. 11 is an exploded perspective view of the key components of the edger-trencher depicted in FIG. 10.

FIGS. 10–14 illustrate another embodiment of the invention in which the pivotable swing arm-cutting blade combination of the invention is mounted on a stand-alone, gasoline powered, belt-driven edger-trencher 92. As has been pointed out above, for heavy duty edging and trenching applications hydraulic power has distinct advantages. However, for lighter duty edging and trenching belt-driven machines are often adequate, and will greatly benefit from this unique pivotable swing arm-cutting blade combination. In FIG. 10 a stand-alone unit of this type is depicted. The machine has a frame 100 supported by two rear wheels 94, two front wheels 96, and an adjustable front guide wheel 98 for the cutting blade. A gasoline powered engine 102 is supported on the frame. Guide arm rails 110 at the rear of the machine provide the means for the operator to guide the edging operation. A pivotable swing arm 22 is positioned at one side of the unit, positioned with the pivot mounting shaft 116 at a first end of the swing arm at approximately the midpoint of the edger-trencher 92 between the engine 102 and the adjustable front wheel 98, with the edger blade 26 connected at a second end of the swing arm adjacent the adjustable front wheel. At the first end of the swing arm a mounting box 127 is secured to the side of the engine 102, providing the means for securing a first pulley 134, a height adjusting cord 108, a pivot mounting shaft 116, and the first end of the swing arm at this edger-trencher midpoint. The components for the connection and powering of the swing arm and edger blade 26 to the edger-trencher is clearly seen in FIG. 11. The engine shaft 138 projects through an opening in the mounting box 127, and the belt 136 for powering the edger blade 26 is connected between said first pulley 132 (secured to the engine shaft by a set screw 134), and a second pulley 148 which is part of the final drive unit 151. Connected to an opening in the mounting box 127 directly opposite the opening for the engine shaft 138 is the pivot mounting shaft 116. The pivot mounting shaft 116 provides the pivotable connection on the inside of the mounting box 127 for the counter balance shaft 104 and its extension shaft 152 connecting the counter balance shaft 104 to the final drive unit, and a spacer bushing 128 between the extension shaft 152 and the mounting box. On the outside of the mounting box the pivot mounting shaft provides the pivotable connection for the rigid adjuster 48 for the swing arm 22, and the adjustable knob 112 on the end of the pivot mounting shaft 116. The pivot mounting shaft itself has a pin 117 extending through its width at a first end of this shaft through an opening 120 in the shaft, and a second pin 114 extending through its width at a second end of the shaft. A spring 124 is secured on the shaft. The pivot mounting shaft has a slot 122 extending through its width adjacent the second end of the shaft. The purpose of this slot 122 is to provide the means for accepting a locking pin 118 inserted in the opening 119 in the adjustment knob for locking the swing arm in a given position when the pivoting action of the swing arm is not required. The pivot mounting shaft is further secured to the mounting box by a set screw 126 in a side arm projection of the mounting box.

At the second end of the swing arm the final drive unit 151 provides the means for connecting together the second pulley 148 and the belt 136, the counter balance weight shaft 104 and its extension shaft 152 with its belt tension spring 154 and position adjustment screw 150, the height adjusting cord 108, the rotary shaft 146 connected to the second pulley, the spacer bushing 144, the blade guard 28, and the edger blade 26 secured to the rotary shaft 146 via a threaded nut 140 passing through the opening 142 in the edger blade.

Figure 12:
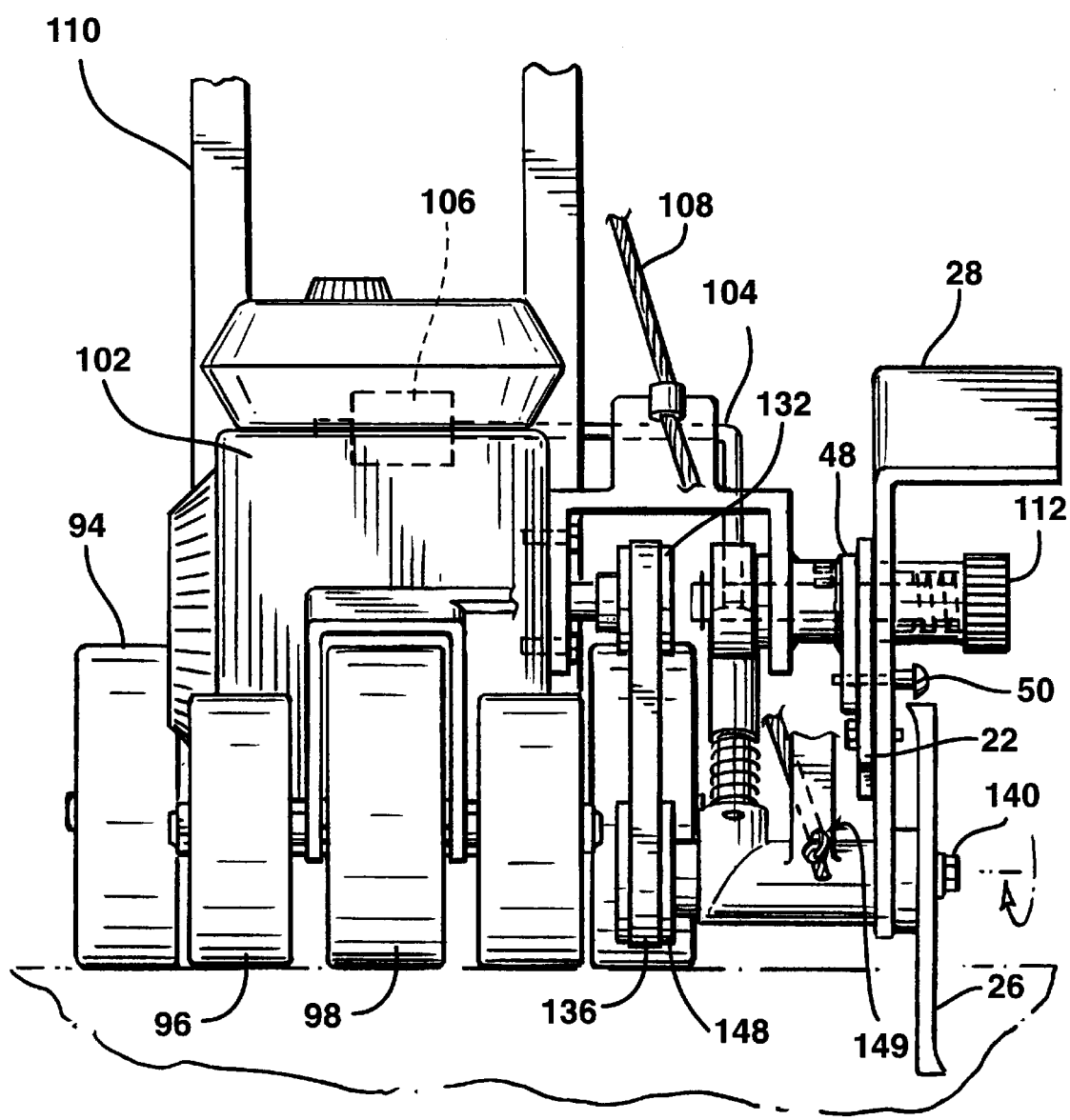
FIG. 12 is a front elevational view of the edger-trencher depicted in FIG. 10.
Figure 13:
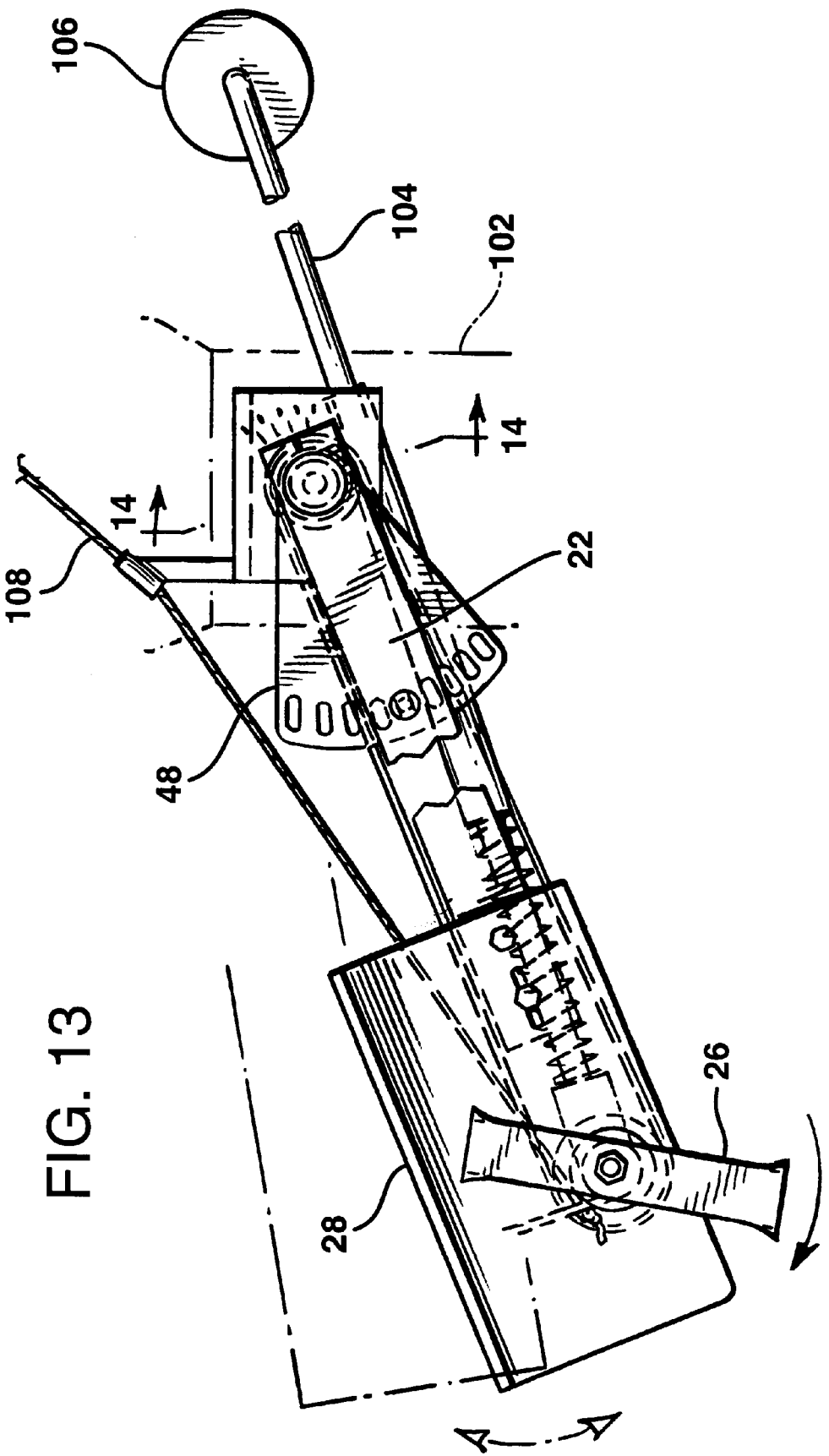
FIG. 13 is a side view of the pivotable swing arm and adjustment means for the edger-trencher depicted in FIG. 10.
Figure 14:
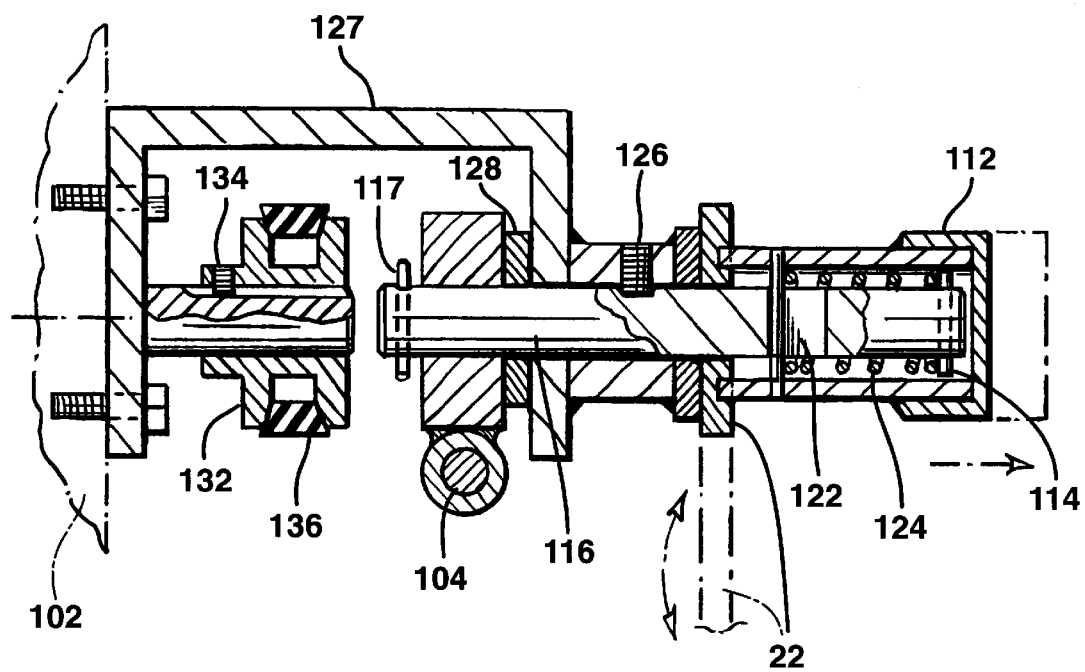
FIG. 14 is a cross-sectional view of the pivot region of the edger-trencher depicted in FIG. 10 as taken along the line 14—14 of FIG. 13.

As best seen in FIGS. 12 and 13 turning on the edger-trencher 92 engine will cause the belt 136 interconnecting the first 132 and second 148 pulleys to rotate, which in turn causes the edger blade 26 to rotate. Prior to operation counter-weights 106 will have been placed on the counter balance weight shaft 104 if required, which will been secured to its extension shaft 152 inserted into the final drive unit 151 via an opening 153 in the unit, with the set screw 150 in the final drive unit providing the positional securing means for adjusting the tension of the spring 154 on the shaft extension to whatever proper belt 136 tension the operator deems desirable. If the operator wishes to make use of the pivotable action of the swing arm-cutting blade of the invention, the cutting height adjusting cord 108 which is connected to a hook 149 on the final drive unit 151 is pulled upwards by the operator to adjust the edger blade to produce a desired edge depth. A series of knots 143 (FIG. 10) cooperate with notched plate 145 to adjust the length of the cord 108 between the hook 149 and the plate 145, and thus the cutting height of the swing arm. If this feature of the invention is not employed, after the cutting depth has been selected a pin 118 is inserted into the adjustment knob 112 on the pivot mounting shaft, and the edger-trencher will now perform in a traditional manner. As the edger blade 26 proceeds in a lawn edging procedure the adjustable front wheel 98, which is connected to the blade guard 28 by an interconnecting rigid plate 99, insures that the belt drive remains above the soil as the lawn edging proceeds.

Figure 15:
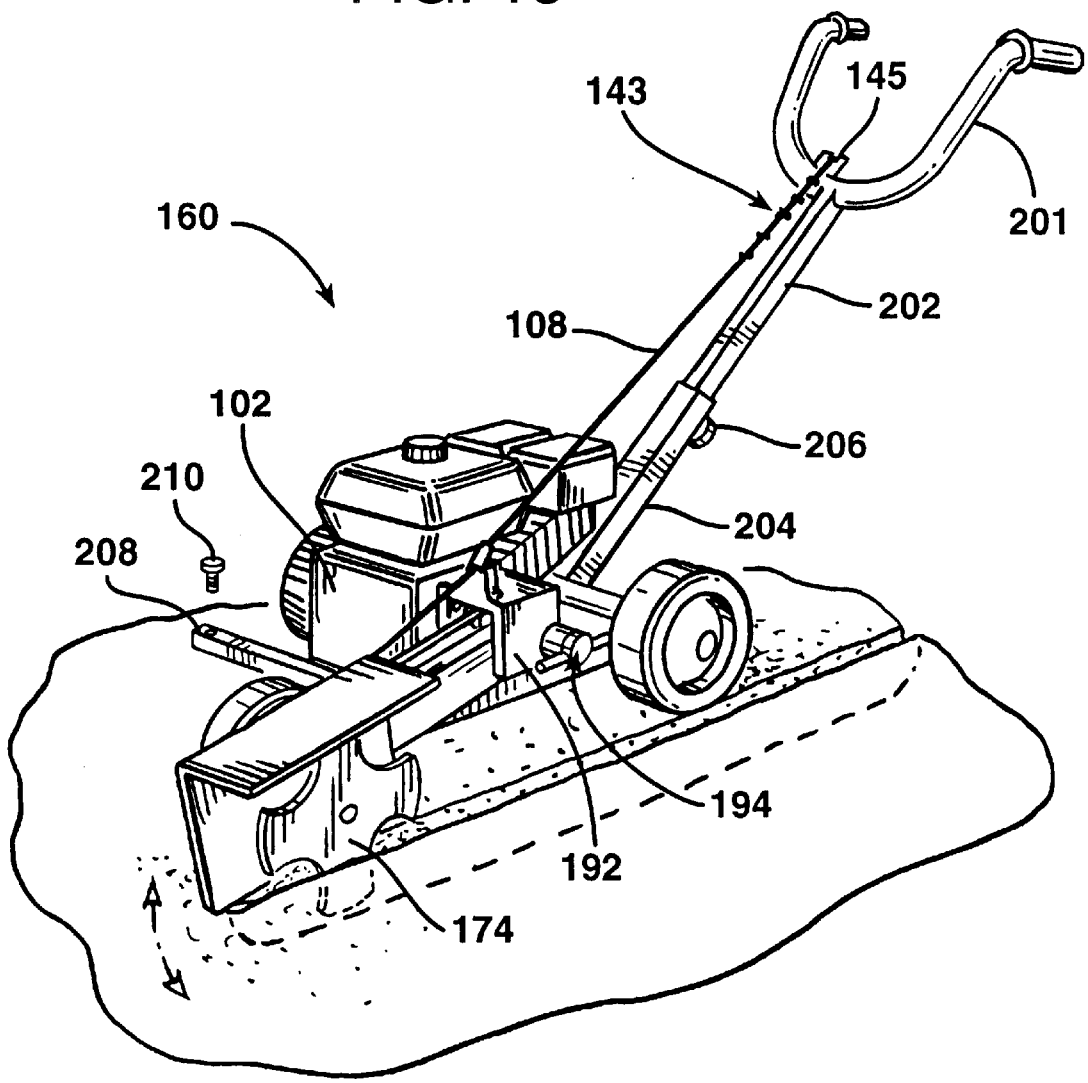
FIG. 15 is a second version of the stand-alone, belt-driven edger-trencher of the invention depicted in FIG. 10 adapted for quick connection to commercial or residential mowers of the rider or walk along type.
Figure 16:
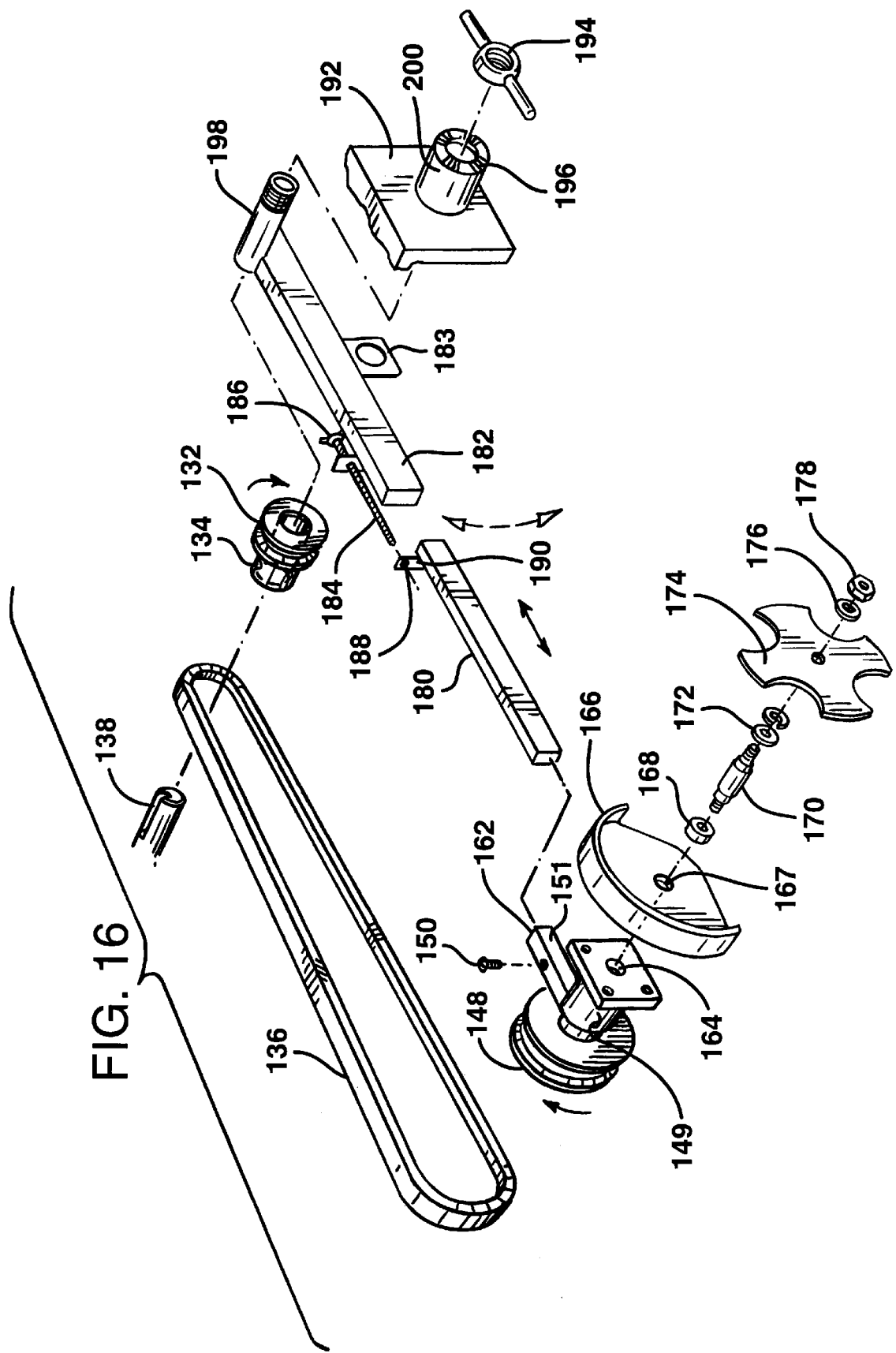
FIG. 16 is an exploded, perspective view of the key components of the edger-trencher depicted in FIG. 15.
Figure 17:
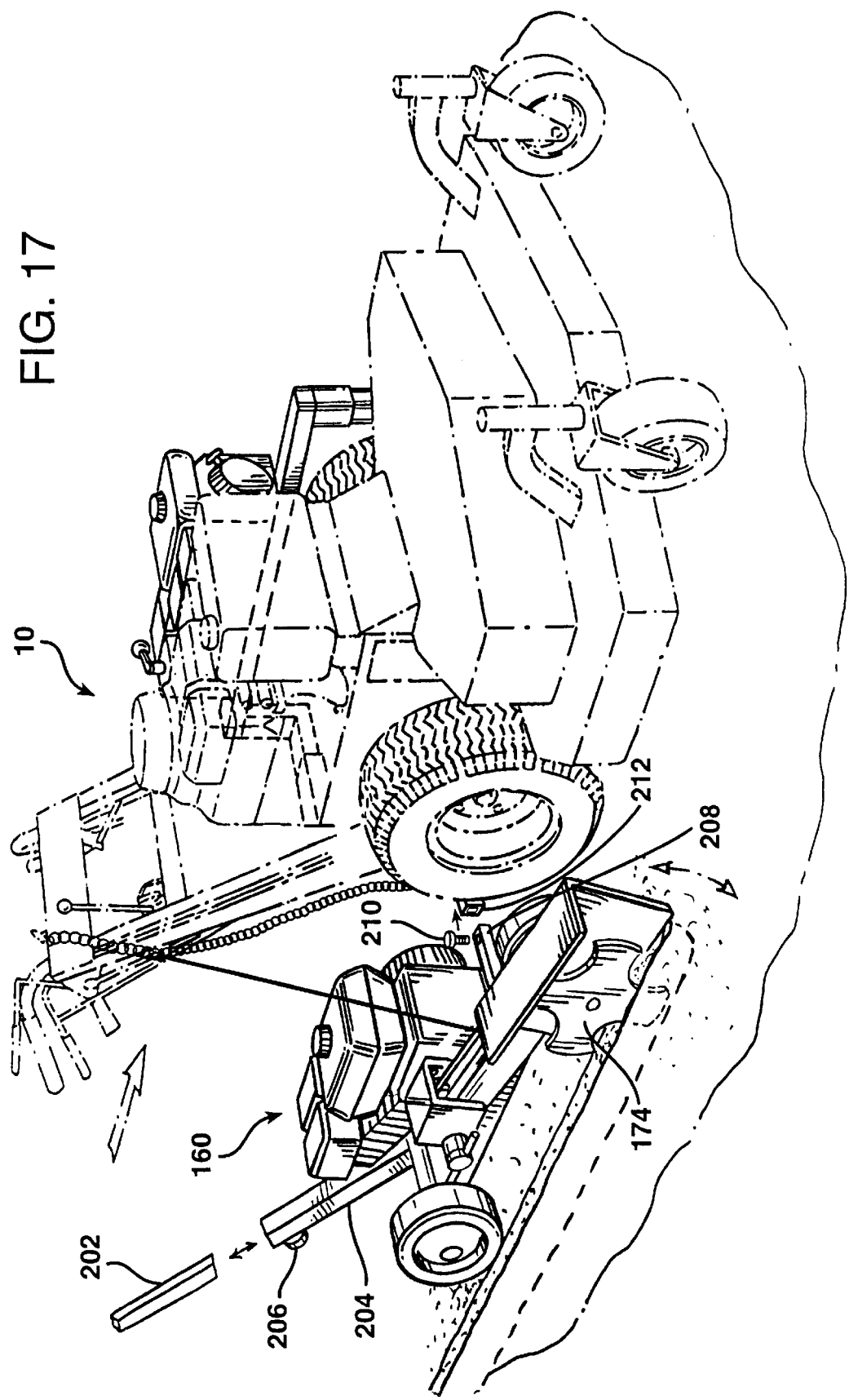
FIG. 17 is a perspective, partially sectional view of one version of the edger-trencher of the invention illustrating the edger-trencher of FIG. 15 about to be quick connected to an hydraulically powered professional mower.

FIGS. 15–17 illustrate an alternate version 160 of the stand-alone, gasoline powered, belt-driven edger-trencher 92 depicted in FIGS. 10–14. Similarly to the previously described version, the edger-trencher of FIG. 15 has a pivotable swing arm (180, 182) mounted at one side of the edger-trencher. A cutting blade 174 is rotatably attached at a first end of the swing arm 180. A mounting box 192 is affixed to the gasoline engine to cooperate in enclosing and securing the second end of the swing arm 182. The mounting box has an external tube 200 for accepting the passage therethrough of pivot mounting shaft 198. The pivot mounting shaft is connected to the engine shaft 138, runs through an opening in a first pulley 132 and being secured to this first pulley by a set screw 134, runs through a tubular attachment 183 on the underside of the second half of the swing arm 182, then runs through the opening in the mounting box external tube 200, and is finally secured to a ridge adjustment wing nut 194. At the first end of the swing arm a second pulley 148 provides the means for securing the first section of the swing arm 180 and cutting blade 174 together. The rectangularly shaped end of the first section 180 of the swing arm connects to a rectangular opening 162 in the final drive unit 151, being secured thereto by a set screw 150. A blade guard 166 is secured to the final drive unit by means of a spacer nut 168 and a first end of a spacer bolt 170 being secured through an opening 167 in the blade guard and an opening 164 in the final drive unit, the spacer bolt 170 being threadably secured to a rotating shaft (not shown) within the final drive unit. The second end of the spacer bolt 170 secures the cutting blade adjacent the belt guard in a rotatable assembly by means of washers 172, 176, and a nut 178. A belt 136 has been previously placed around the first 132 and second 148 pulleys to provide the means for rotating the cutting blade 174. Slots 196 in the surface of the mounting box external tube 200 provide for securing the winged arms of the ridged adjustment wing nut 194 in a locked position. This locking wing nut arrangement now permits locking the swing arm in a given position when the pivoting action of the swing arm is not required.

Provisions are also made for adjusting the tension on the belt 136 as required. The second section 182 of the swing arm is slidably secured to the first section 180 of the swing arm. The combined lengths of the two sections of the swing arm can be increased or decreased by making use of the threaded bar 184 and its attached wing nut 186, said bar being secured to a threaded hole 188 in an upstanding arm 190 affixed to the first section 180 of the swing arm.

The main purpose of this alternate stand-alone, gasoline powered, belt-driven edger-trencher is best seen in FIGS. 15 and 17. A mounting sheath 208 is affixed to the side of the edger-trencher opposite to the pivotable swing arm. This sheath slips over a mounting rod 212 affixed to either side of, for example, an hydraulically powered professional mower 10, the mounting sheath 208 being secured to the mounting rod 212 by means of a set screw 210. In this fashion the edger-trencher 160 can be quickly connected to commercial or residential mowers of either the rider or walk behind type by simply affixing a mounting rod 212 to any of these routinely commercially available mowers. To further assist in a convenient conversion of this stand-alone edger-trencher 160 as an accessory for the above described mowers the handles 201 and first section 202 of guide arm can be removed from the second section 204 of the guide arm by simply loosening a set screw 206 in this second section.

If the operator wishes to make use of the pivotable action of the swing arm cutting blade of the invention, the cutting height adjustment cord 108, which is connected to a hook 149 on the final drive unit 151, is pulled upwards by the operator to adjust the edger blade to produce a desired edge depth. A series of knots cooperate with a notched plate (FIG. 10) to adjust the length of cord between the hook 149 and plate 145, and thus the cutting height of the swing arm.

For the purposes of this invention what is meant by the term "commercial mower" is the heavy duty lawn mowers normally used by lawn maintenance companies. The term "residential mower" is used to identify the type of lawn mower most commonly employed by owners of individual homes. The term "rider type" refers to mowers wherein the machine has provisions for having the operator sit at the rear of the machine and direct its operation from this sitting position. The term "walk behind type" refers to the more commonly seen lawn mower wherein the operator walks behind the machine and directs its operation making use of handles affixed to the rear of the mower.

Thus it can be seen that the instant invention provides important new conveniences and efficiencies in lawn maintenance procedures. Lawns can now be edged or trenched without the fatiguing stop and go jolting previously inevitably associated with traditional power assisted lawn edging and trenching equipment. Existing lawn mowers and edger-trenchers can be retrofitted, or specific machines incorporating the principles of the invention can be made commercially available.

While the present invention has been disclosed in connection with versions shown and described in detail, various modifications and improvements thereon will become readily apparent to those skilled in the art. Accordingly, the spirit and scope of the present invention is to be limited only by the following claims.

What is claimed is:

1. A device including a frame for digging a groove in a section of land, said device comprising:

(a) means for moving said device over said section of land into which said groove is to be dug, said moving means having a left side and a right side, and a front section and a rear section;

(b) a swing arm being pivotably connected to one side of said moving means, said swing arm having a first end and a second end, said swing arm being positioned a spaced distance away from said moving means;

(c) a blade for cutting said groove in said section of said land;

(d) said blade being rotatably mounted on said first end of said swing arm a spaced distance away from the pivot point of said swing arm, said swing arm pivotably biased from its second end to its first end in a downward direction;

(e) a counter-weight positionable along the length of said swing arms said counter-weight securable to said swing arm at any position there along as determined by the user, whereby the user is able to purposely adjust the downward force exerted by said blade upon the land with which it is in contact, said downward force sufficient to overcome the soil resistance experienced by the blade in digging the groove as said device moves over the land;

(f) means for adjusting the depth of said groove in said land when said groove is dug in said land; and (g) means for automatically rotating said blade at said first end of said swing arm so that when said depth adjusting means has been adjusted to a predetermined groove depth by an operator of said device, and with said blade being in contact with said land due to gravity, turning on said means for automatically rotating said blade causes said blade to rotate at said first end of said swing arm and thereby create said groove in said section of said land when said means for moving said device causes said device to move over said section of land, said swing arm being free to pivot upwards and away from said land, such that when said blade encounters high soil resistance in said groove or objects, said high soil resistance or object results in a force exerted on said swing arm and said blade, said force sufficient to overcome the effect of the downward force exerted by said blade such that said swing arm and said blade are rotatably thrust upward a distance about the pivotable connection of said swing arm to said one side of said moving means, said distance a function of the soil resistance or object encountered and said downward force, said swing arm and said blade capable of then falling down into said groove under the influence of said downward force, and repeating said up and down movements until said high soil resistance or object is overcome to thus provide substantially smooth, jolt free grooving of the land.

2. The device according to claim 1 wherein said means for moving said device comprises at least two wheels affixed to the frame of said device.

3. The device according to claim 1, further comprising a blade guard mounted on said swing arm between said blade and the frame of said device to deflect debris thrown by said blade away from said operator of said device.

4. The device according to claim 1 wherein said means for adjusting said groove depth is a cord interconnecting the frame of said device and said swing arm.

5. The device according to claim 1 wherein said means for adjusting said groove depth is a chain interconnecting the frame of said device and said swing arm.

6. The device according to claim 1 wherein said means for rotating said blade is a belt rotating around two pulleys, said pulleys being powered by an engine mounted on the frame of said device.

7. The device according to claim 6, further comprising means for quick connection of said device to a commercial mower of the rider or walk behind type, said commercial mower having means for cooperating with said quick connection means of said device.

8. The device according to claim 6, further comprising means for quick connection of said device to a residential mower of the rider or walk behind type, said residential mower having means for cooperating with said quick connection means of said device.

9. The device according to claim 1 wherein said means for rotating said blade is a hydraulic motor rotatably connected to said blade, said hydraulic motor being hydraulically driven by a hydraulic power supply mounted on the frame of said device.

10. The device according to claim 8, further comprising means for controlling the speed of rotation of said cutting blade.

11. The device according to claim 1 wherein said device for digging a groove in said section of said land is capable of forming an edge demarking a grassy area from a plant bed area in a lawn.

12. The device according to claim 1 wherein said device for digging a groove in said land is capable of forming a trench in a lawn.

13. The device according to claim 11 wherein said cutting blade is an edger blade.

14. The device according to claim 12 wherein said cutting blade is a trencher blade.

15. The device according to claim 14 wherein said trencher blade comprises a first section and a second section with a spring mounted therebetween, said second section being fixed in position on a rotatable plate, said first section being slidably attached to said second section so that when the tip of said two section trencher blade encounters said high soil resistance said first section slides within said second section, thereby contracting said spring, said sliding of said first section cooperating with said upward movement of said swing arm, said spring within said two section trencher blade then causing said first section to return to its original position outside of said second section during said downward movement of said swing arm.

16. An engine powered lawn mower having in combination an edger-trencher attachment, comprising:

(a) a lawn mower having a wheel mounted frame for supporting said engine;

(b) said mower having lawn cutting blades rotatably affixed to said engine, said lawn cutting blades being positioned within said mower frame;

(c) said mower having means for accepting said edger-trencher attachment at one side of said mower frame;

(d) an edger-trencher attachment having a hydraulic power engine, hydraulic fluid reservoir, hydraulic fluid pump, and pivotable swing arm with attached edger-trencher blade rotatably connected to a hydraulic motor, said hydraulic motor being connected by hydraulic fluid tubing to said reservoir, said edger-trencher blade being connected at a first end of said swing arm at a spaced distance away from the pivot point of said swing arm, said swing arm pivotably biased from the second end of said swing arm to said first end of said swing arm in a downward direction;

(e) a counter-weight positionable along the length of said swing arm, said counter-weight securable to said swing arm at any position there along as determined by the user, whereby the user is able to purposely adjust the downward force exerted by said edger-trencher blade upon the land with which it is in contact, said downward force sufficient to overcome the soil resistance experienced by said edger-trencher blade in digging the groove as said lawn mower moves over the land; and, (f) means for adjusting the depth of a groove to be dug in said land by said edger-trencher blade, so that when said edger-trencher attachment is connected to said accepting mower means, and when said mower is caused to be moved over a section of said land by an operator of said mower, and when said operator has adjusted said depth adjusting means to a predetermined groove depth, and when said hydraulic power engine is turned on by said operator said edger-trencher blade is caused to rotate, said edger-trencher blade being rotated by said hydraulic motor, said edger-trencher blade thereby creating said groove in said section of land as said mower is caused to be moved over said land, said swing arm being free to pivot upwards and away from said land, such that when said edger-trencher blade encounters high soil resistance or an object in said groove, said high soil resistance or object results in a force exerted on said swing arm and said blade, said force sufficient to overcome the effect of the downward force exerted by said blade such that said swing arm and said blade are rotatably thrust upward a distance about the pivotable connection of said swing arm to said one side of said moving means, said distance a function of the soil resistance or object encountered and said downward force, said swing arm and said edger-trencher blade capable of then falling down into said groove under the influence of said downward force, and repeating said up and down movements until said high soil resistance or object is overcome to thus provide substantially smooth, jolt free grooving of the land.

17. A method for digging a groove in land utilizing a power assisted machine free of stop and go, operator jolting effects, comprising the steps of:

(a) connecting a pivotable swing arm to a wheeled frame;

(b) connecting a cutting blade to one end of said swing arm, said cutting blade biased to rest on the land;

(c) providing an automatic power assist mounted on said frame for rotating said cutting blade;

(d) providing a counter-weight positionable along the length of said swing arm, said counter-weight securable to said swing arm at any position there along as determined by the user, whereby the user is able to purposely adjust the downward force exerted by said cutting blade upon the land with which it is in contact, said downward force sufficient to overcome the soil resistance experienced by the cutting blade in digging the groove as said machine moves over the land;

(e) permitting said swing arm to freely pivot in an upward direction away from said land when said cutting blade encounters high soil resistance or an object in said groove, said high soil resistance or object resulting in a force exerted on said swing arm and said blade, said force sufficient to overcome the effect of the downward force exerted by said blade such that said swing arm and said blade are rotatably thrust upward a distance about the pivotable connection of said swing arm to said wheeled frame, said distance a function of the soil resistance or object encountered;

(f) permitting said cutting blade to fall down into said groove under the influence of said downward force; and (g) allowing this up and down motion of said swing arm and said cutting blade to continue until said high soil resistance or object is overcome to thus provide substantially smooth, jolt free grooving of the land.

18. The method according to claim 17, further comprising the step of quickly connecting said power assisted machine to a commercial mower of the rider or walk behind type.

19. The method according to claim 17, further comprising the step of quickly connecting said power assisted machine to a residential mower of the rider or walk behind type.

20. The method according to claim 17 wherein said power assist for rotating said cutting blade is an engine powered belt-drive.

21. The method according to claim 17 wherein said power assist for rotating said cutting blade is an hydraulic power system.

\* \* \* \* \*